(12) United States Patent
Goldberg et al.

(10) Patent No.: US 7,447,523 B2
(45) Date of Patent: *Nov. 4, 2008

(54) COORDINATION OF BACKHAUL BEAM FORMING IN WIRELESS COMMUNICATION SYSTEMS

(75) Inventors: Steven Jeffrey Goldberg, Downingtown, PA (US); Kimberly Chotkowski, West Chester, PA (US)

(73) Assignee: Interdigital Technology Corporation, Wilmington, DE (US)

( * ) Notice: Subject to any disclaimer, the term of this patent is extended or adjusted under 35 U.S.C. 154(b) by 598 days.

This patent is subject to a terminal disclaimer.

(21) Appl. No.: 10/845,829

(22) Filed: May 14, 2004

(65) Prior Publication Data

US 2005/0020311 A1    Jan. 27, 2005

Related U.S. Application Data

(63) Continuation-in-part of application No. 10/730,671, filed on Dec. 8, 2003, now Pat. No. 7,197,337, and a continuation-in-part of application No. 10/731,760, filed on Dec. 9, 2003, now Pat. No. 7,373,176.

(60) Provisional application No. 60/471,159, filed on May 16, 2003, provisional application No. 60/475,585, filed on Jun. 4, 2003.

(51) Int. Cl.
  *H04B 1/38* (2006.01)
  *H04M 1/00* (2006.01)

(52) U.S. Cl. .................... 455/561; 455/562.1; 455/13.3; 455/63.4; 342/368

(58) Field of Classification Search ............. 455/562.1, 455/561, 13.3, 63.4, 53.4; 342/368
See application file for complete search history.

(56) References Cited

U.S. PATENT DOCUMENTS

| | | | |
|---|---|---|---|
| 5,258,764 A | 11/1993 | Malinowski | |
| 5,650,926 A | 7/1997 | Faber | |
| 6,225,961 B1 | 5/2001 | Benjauthrit | |
| 6,417,803 B1 | 7/2002 | De La Chapelle et al. | |
| 6,665,545 B1 | 12/2003 | Raleigh et al. | |
| 6,768,454 B2 | 7/2004 | Kingsley et al. | |
| 6,894,643 B2 | 5/2005 | Guo et al. | |
| 6,993,361 B2 | 1/2006 | Chitrapu | |
| 6,999,795 B2 | 2/2006 | Chitrapu | |
| 7,016,702 B2 | 3/2006 | Chitrapu | |
| 7,103,384 B2 | 9/2006 | Chun | |
| 7,197,337 B2 | 3/2007 | Goldberg et al. | |
| 2001/0031647 A1 | 10/2001 | Scherzer et al. | |
| 2002/0097700 A1 | 7/2002 | Alastalo et al. | |
| 2003/0043435 A1 | 3/2003 | Oettinget et al. | |
| 2004/0116146 A1 | 6/2004 | Sadowsky et al. | |
| 2004/0204108 A1 | 10/2004 | Etkin et al. | |
| 2005/0020311 A1* | 1/2005 | Goldberg et al. ......... | 455/562.1 |

FOREIGN PATENT DOCUMENTS

| EP | 1071228 | 1/2001 |
|---|---|---|
| FR | 2581798 | 11/1986 |
| TW | 200427345 | 12/2004 |
| WO | 03/007420 | 1/2003 |
| WO | 03/098837 | 11/2003 |

\* cited by examiner

*Primary Examiner*—Sujatha Sharma
(74) *Attorney, Agent, or Firm*—Volpe and Koenig, P.C.

(57) ABSTRACT

A method and system for coordinating the use of beam forming between two communicating entities in a wireless communication system is disclosed. The two entities may communicate control information regarding their respective use of beam forming. A correction factor for at least one entity is provided wherein said entity may reduce or withhold its beam adjustment in order to correct any error measured in the alignment of its beam with respect to the beam of the other entity with which it is communicating. Adjustment parameters for adjusting the beams are selected based on conditions surrounding the communication.

12 Claims, 6 Drawing Sheets

BEFORE ADJUSTMENT     POST ADJUSTMENT

US 7,447,523 B2

COORDINATION OF BACKHAUL BEAM FORMING IN WIRELESS COMMUNICATION SYSTEMS

CROSS REFERENCE TO RELATED APPLICATIONS

This application is a continuation-in-part of U.S. patent application Ser. No. 10/730,671 filed Dec. 8, 2003 now U.S. Pat. No. 7,197,337 and U.S. patent application Ser. No. 10/731,760, filed Dec. 9, 2003, which claim the benefit of U.S. provisional application 60/471,159, filed May 16, 2003 and U.S. provisional application 60/475,585, filed Jun. 4, 2003, which are incorporated by reference as if fully set forth.

FIELD OF INVENTION

The present invention relates to wireless communication systems. More specifically, the present invention relates to coordination of beam forming in wireless communication systems.

BACKGROUND

Generally, beam forming is where transmission or reception of signal power is concentrated in the direction of an intended respective receiver or transmitter. Both the transmission and reception of signals can benefit from beam formed patterns compared to omni-directional patterns. From a transmitter's perspective, beam forming lessens the power needed to perform the transmission, and lessens the power causing interference directed to nonintentional receivers. From a receiver's perspective, beam forming enhances the desired received signal and lessens the interference due to other transmitters or signal sources the further they are removed from the primary axis of a transmission.

Referring to FIG. 1, beam forming is usually associated with fixed infrastructures such as microwave towers 10, 12, for example. This is because it is relatively easy to point static transmit and receive beams of microwave towers 10, 12 toward each other as shown in FIG. 1. The structures on which the towers are mounted and the beam widths that are utilized simply need to be sufficiently stable so that the beams remain overlapped thereby providing reliable transmission. If towers or beams are unstable due to structural or electrical instabilities, the beams may not adequately overlap as shown in FIG. 2. In such situations, however, correction is relatively easy because the beams are transmitted from two fixed locations and the degree of misalignment is typically relatively minor.

With rapidly increasing capacity and coverage requirements of wireless communication systems, however, beam forming may also be used between base stations and wireless transmit/receive units (WTRUs). Referring now to FIG. 3, there is shown a base station 20 that is using beam forming and a WTRU 22 that is using an omni-directional pattern. Ignoring possible external influences on the beam (i.e. physical obstructions), the base station 20 should have a reasonably static pattern position. The WTRU 22, on the other hand, is subject to rotation and location movement in any direction. If the transmission pattern of the WTRU 22 is truly omni-directional (i.e. approximated by a circle), rotation will have no effect on the communications link. Location movement, however, will pose a problem in that it can change the relationship of the WTRU 22 and base station 20 communication link. For example, in FIG. 3, WTRU 22 is initially emitting omni-directional pattern 24 and then changes location and begins emitting omni-directional pattern 26. The base station 20 may therefore need to modify its beam to maintain contact. Extreme changes could of course require switching to another base station, which is called handoff (or handover) and occurs naturally in existing wireless communication systems.

Referring to FIG. 4, the base station 30 is using an omni-directional pattern and the WTRU 32 is using beam forming. Here, a further problem is introduced in that, because the WTRU 32 is using beam forming, location movement as well as rotation can now deteriorate the pattern overlaps between the base station 30 and WTRU 32. For example, in this situation, WTRU 32 is initially emitting beam pattern 34 and then changes position as a result of rotation or location movement or both and begins emitting beam pattern 36. This situation, however, can also be handled using handoff which, as mentioned, is an existing capability of existing systems. It should be noted that the omni-directional pattern of the base station 30 could be replaced by a sectored pattern as is often found in wireless systems. The key point is that the base station 30 is providing complete coverage surrounding its location so that while rotation and location movement of a WTRU 32 may require handoff between sectors, this is an existing capability of existing wireless systems.

As shown in FIG. 5, however, where both entities (i.e. a base station and WTRU) are using beam forming, movement by a WTRU 40 (see dashed patterns) is more likely to disrupt the pattern overlap. That is, while beam forming improves communications when properly aligned patterns are used, misalignment is more likely where both WTRUs and base stations use beam forming thereby making link establishment and maintenance more time consuming and difficult.

For example, in FIG. 6, the "before adjustment" situation shows two misaligned beams. In the prior art, the entities from which those beams originate Xa, Xb (both of which may be a base station or WTRU) both determine an adjustment to better align the beams, but since they are not aware of what the other is doing, they both perform the required adjustment. The net adjustment, therefore, causes a resultant error in alignment that is roughly equivalent to the original error, but with the beams pointing in different directions as shown in the "post adjustment" situation. The next time the adjustments are attempted, the same thing can happen thereby causing the beams to fall into an oscillating pattern around the optimal alignment of the beams. It is important to note that there is no implied timing relationship between the measurements or actual adjustments of the beams. Therefore, the only situation required to cause this problem is that the measurements made by one entity and the resultant adjustment that is performed are time overlapping with the same measurements and resultant adjustment occurring at another entity.

What is needed, therefore, is a method and system for coordination of beam forming in wireless communication systems.

SUMMARY

The present invention is a method and system for coordinating the use of beam forming between two communicating entities in a wireless communication system. The two entities may communicate control information regarding their respective use of beam forming. A correction factor for at least one entity is provided wherein said entity may reduce or withhold its beam adjustment in order to correct any error measured in the alignment of its beam with respect to the other entity with which it is communicating.

Another embodiment of the invention is applicable when one or both of the entities are unaware as to whether the other is capable of beam forming. A correction factor is therefore calculated and used by one entity in a fashion that will be practical whether or not the other entity is capable of beam forming, or whether or not the other entity is utilizing the present invention.

The beams may be adjusted using any appropriate adjustment parameters for adjusting beams or any combination thereof. That is, a beam may be adjusted by adjusting a single adjustment parameter, a particular combination of available adjustment parameters, or all of the available parameters so that the measured error is corrected. Further, the same or different adjustment parameters may be used in the elevation and azimuth dimensions. Similarly, the same or different adjustment parameters may be used by two communicating entities.

BRIEF DESCRIPTION OF THE DRAWING(S)

DETAILED DESCRIPTION OF THE PREFERRED EMBODIMENT(S)

Herein, a wireless transmit/receive unit (WTRU) includes but is not limited to a user equipment, mobile, mobile station, receiver, transmitter, fixed or mobile subscriber unit, pager, or any other type of device capable of operating in a wireless environment. When referred to herein, a base station includes but is not limited to a Node-B, receiver, transmitter, site controller, access point or any other type of interfacing device in a wireless environment.

Further, it is important to note that like any antenna pattern, the outline of a beam shown in a drawing is merely a depiction of the signal attenuated a specified amount from the maximum energy within the pattern. The signal actually continues beyond the outline, but at an additionally attenuated level. The patterns shown in the figures herein are meant to depict levels at which communications are possible. These levels are in fact subject to both transmitter and receiver capabilities. When shown overlapping, it is meant to depict patterns that are suitable for acceptable communications given the purpose under prevailing conditions.

For simplicity, one-dimensional transmission patterns are shown and described herein. It is important to note, however, that the misalignment of beams and any adjustments made based thereon, as shown and described herein, may not only be in the azimuth (i.e. horizontal) or elevation (i.e. vertical) dimensions, but also a combination thereof. That is, misaligned beams as shown and described herein may be misaligned in the azimuth dimension, the elevation dimension, or a combination thereof. Similarly, adjustments made to correct misaligned beams according to the present invention may be performed in the azimuth dimension, the elevation dimension, or combination thereof. Further, beam width as used herein may be horizontal beam width or vertical beam width. That is, when adjusting beams by adjusting their beam width, the beam may be adjusting its horizontal beam width, vertical beam width, or a combination thereof.

For convenience, the present invention is described between a base station and WTRU, but may of course be implemented between any two entities that may negotiate the use of beam forming. Once contact is established between two entities, say a base station and WTRU, they will negotiate the use of beam forming. Both entities will agree to beam form only when the WTRU's rotation and location (both azimuth and elevation) are deemed sufficiently stable. This could be, for example, a setting in the WTRU established by interaction with the user, motion sensors in the WTRU, or monitoring of the characteristics of the communication channel. The actual degree of beam forming from each entity is a function of power available, distance, and mitigating factors beyond the control of the transceivers (e.g. fading, multipath, environmental conditions) and is preferably optimized with respect to power consumption and interference from and to other transceivers.

Figure 7:
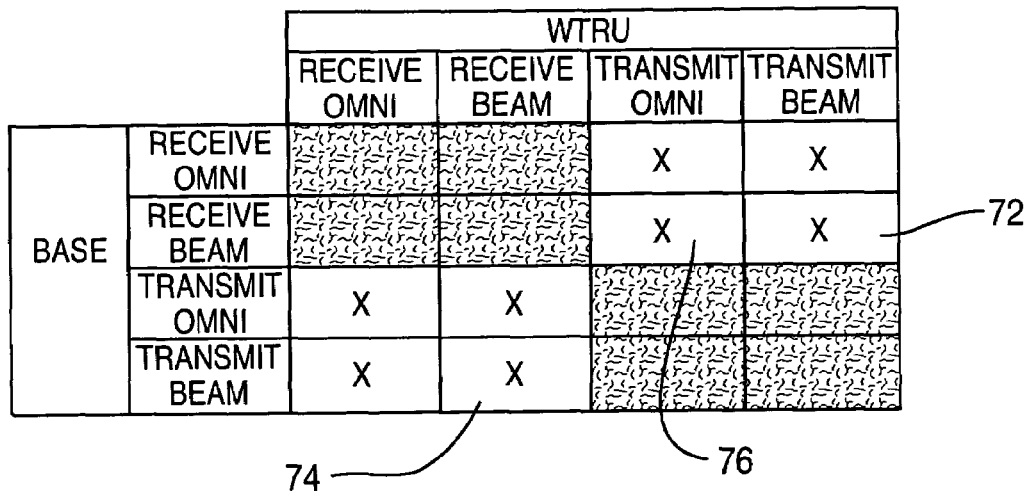
FIG. 7 is a table illustrating an example of transmission pattern scenarios where a base station and WTRU are capable of beam forming.

The table in FIG. 7 provides an example of four scenarios for both the up and down links with respect to the use of beam forming. The scenario that is used in each direction is a function of application need, the device's capabilities, the RF environment, and the physical stability of each device. In some circumstances the usage may be different in a given direction. For example, high speed targeted download may best be served by a tight downlink beam at both the sender and receiver (scenarios 72, 74) whereas an uplink acknowledge channel may be better served by an omni-directional transmission and beam formed receiver (scenario 76) to guarantee quick and reliable detection of ack or nack control signals.

Figure 1:
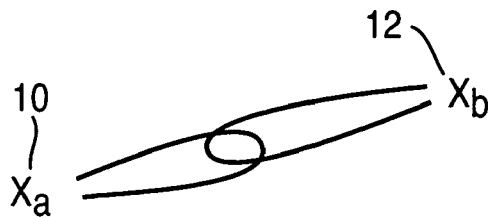
FIG. 1 is a fixed transmitter and a fixed receiver having beamed formed transmissions that are properly aligned according to the prior art.
Figure 2:
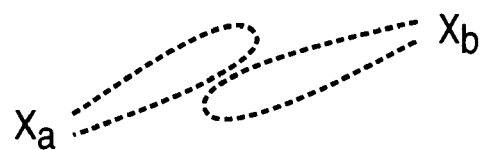
FIG. 2 is a fixed transmitter and a fixed receiver having beamed formed transmissions that have become misaligned according to the prior art.
Figure 3:
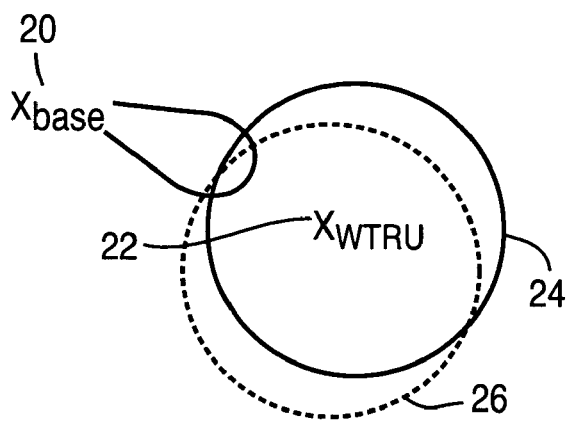
FIG. 3 is a base station using beam forming and a WTRU using an omni-directional pattern according to the prior art.
Figure 4:
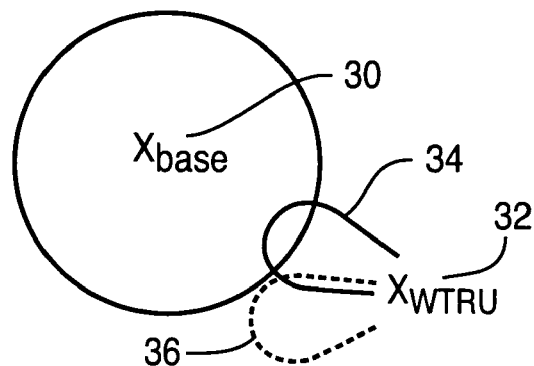
FIG. 4 is a base station using an omni-directional pattern and a WTRU using beam forming according to the prior art.
Figure 5:
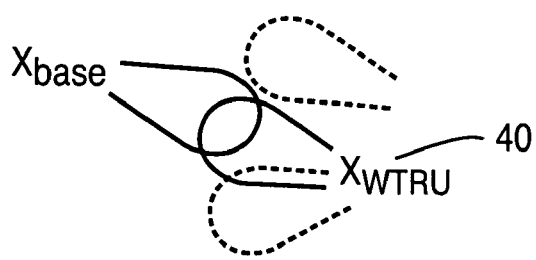
FIG. 5 is a base station and a WTRU wherein their respective beams may become misaligned due to movement of the WTRU according to the prior art.
Figure 6:
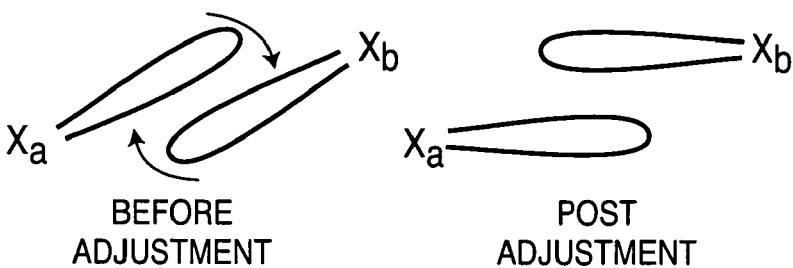
FIG. 6 is two entities Xa, Xb (both of which may be a base station or a WTRU) attempting to correct misalignment of their respective beams according to the prior art.

In a first embodiment, wireless communication systems and the WTRUs operating therein are not capable of communicating and negotiating control of their respective use of beam forming. This may be a result of beam forming deployments in networks or devices which do not announce or negotiate their usage in a given area, for example. The usage of beam forming by both entities therefore becomes problematical as previously explained in connection with FIG. 6.

Therefore, in the first embodiment, control of beam forming in situations such as scenarios 72 and 74 is performed in a non-coordinated fashion to optimize the adjustment of misaligned beams and prevent the beams from falling into an oscillating pattern, as explained in connection with the prior art. Referring now to the "before adjustment" portion of FIG. 8a, which is a plan view of two entities and their beams, at least one of two communicating entities 80, 82, say 80, will perform a correction (i.e. an adjustment) that is equal to a fraction of the degree to which their respective beams 84, 86 are misaligned. That is, entity 80 will perform an adjustment that is a fraction of the error measurement. In this case, there will still be a degree of misalignment after the first few iterations of correction. For example, if one entity is attempting a full correction and the other is implementing the invention, any of the iterations prior to achieving the desired degree of alignment will result in an overshoot condition as shown in the "post adjustment" portion of FIG. 8a. Alternatively, if one entity is not adjusting its beam, or both entities are using the process of the present invention, and the adjustment fraction is less than one-half of the error, the beams will undershoot on each adjustment. If the correction factor of the prior sentence is greater than one-half of the error, the beams will overshoot. Other combinations of percentage of the correction factor and errors in measurement will cause under- or over-shoots. However, the degree of misalignment will decrease with each iteration in all cases wherein as long as one entity is implementing the present invention (i.e. performing an adjustment that is a fraction of the error measured), convergence at a desired degree of alignment will occur. Once the desired degree of alignment is achieved, adjustments can cease until a degree of alignment less than the desired degree is again detected. Of course, the desired degree of alignment may be set according to operator preference.

To further illustrate how beam alignment is achieved in the first embodiment, reference is now made to Table 1, shown below. In Table 1, three example scenarios are shown wherein the adjustment fraction (i.e. correction factor) that is used is one-half (0.5). The error measurements and adjustments are in degrees. In each scenario, entity "A" is using the invention and entity "B" is not.

TABLE 1

| ITERATION | ERROR MEASURED | ENTITY A ADJUSTMENT | ENTITY B ADJUSTMENT |
|---|---|---|---|
| Scenario 1: Overlapping adjustment periods | | | |
| 0 | 32 | 16 | 32 |
| 1 | 16 | 8 | 16 |
| 2 | 8 | 4 | 8 |
| 3 | 4 | 2 | 4 |
| 4 | 2 | 1 | 2 |
| 5 | 1 | 0.5 | 1 |
| 6 | 0.5 | 0 | 0 |
| Scenario 2: B adjusting before A | | | |
| 0 | 32 | | 32 |
| 1 | 0 | 0 | 0 |
| Scenario 3: A adjusting before and more often than B | | | |
| 0 | 32 | 16 | |
| 1 | 16 | 8 | |
| 2 | 8 | 4 | 8 |
| 3 | 4 | 2 | |
| 4 | 2 | 1 | |
| 5 | 1 | 0.5 | 1 |
| 6 | 0.5 | 0 | |

In the first scenario, entities A and B have overlapping adjustment periods. That is, they simultaneously (or nearly so) measure the degree of misalignment (i.e. the error) and adjust their respective beams so that they overlap in order to optimize communications between them. However, as explained, they are not able to communicate regarding their respective use of beam forming. Therefore, to avoid falling into an oscillating pattern, entity A reduces its adjustment to 0.5 of the error that is measured. At iteration 0, an error measurement of 32 degrees results in entity A performing an adjustment of 16 degrees and entity B performing an adjustment of the full 32 degrees. These adjustments result in an error measurement of 16 degrees in iteration 1 (i.e. an overshoot condition as shown in the post adjustment scenario of FIG. 8a). Therefore, in iteration 1, entity A will again adjust its beam half of the error measured (i.e. 8 degrees) and entity B will again adjust its beam in an amount equal to the error measured (i.e. 16 degrees). The pattern continues until iteration 6 where 0.5 degrees is, in this scenario, the desired degree of alignment.

In the second scenario, entity B adjusts prior to entity A. At iteration zero, entity B measures an error of 32 degrees and adjusts its beam 32 degrees. Therefore, in iteration 1, when entity A performs its error measurement, it will not detect an error and will not make an adjustment.

In the third scenario, entity A is adjusting before and more often than entity B. During iterations 0 and 1, entity B takes no action and entity A simply performs its error measurements and adjusts its beam 0.5 of the error measured, as explained above. In iteration 2, there is an error measurement of 8 degrees. Entity A adjusts half of the error measured (i.e. 4 degrees) and entity B adjusts its beam in an amount equal to the error measured (i.e. 8 degrees). This pattern continues until a desired degree of alignment is obtained in iteration 6.

Figure 8A:
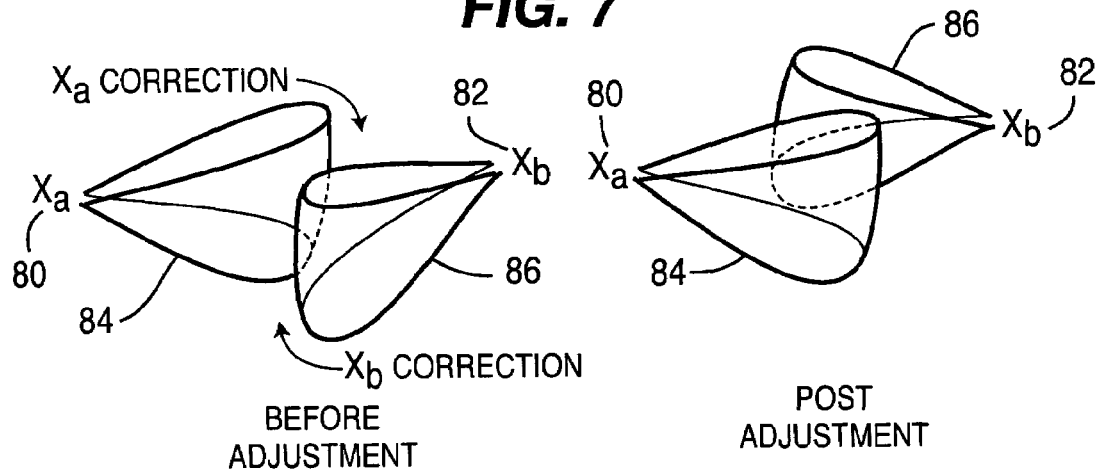
FIG. 8a is a base station and a WTRU correcting misalignment of their respective beams in an azimuth dimension according to a first embodiment of the invention.
Figure 8B:
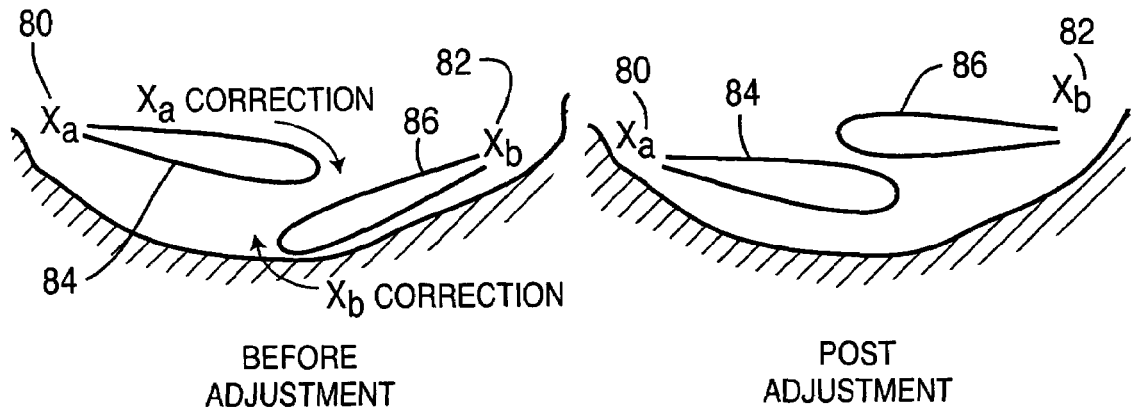
FIG. 8b is a base station and a WTRU correcting misalignment of their respective beams in an elevation dimension according to a first embodiment of the invention.

In FIG. 8a, the error measurements and adjustments are performed in the azimuth dimension. As shown in FIG. 8b, however, it is also possible to perform error measurements and adjustments in the elevation dimension. FIG. 8b is an elevation view wherein a horizontal surface is shown in hashmarks. In FIG. 8b, the error measurements and adjustments that are made are the same as described in connection with FIG. 8a and Table 1, but they occur in the elevation dimension.

It is important to note that the error measurements and adjustments that are made to achieve a desired degree of alignment may need to be made in both the azimuth and elevation dimensions. To illustrate a scenario where adjustments are made in both the azimuth and elevation dimensions, reference is now made to Table 2, shown below. The error measurements and adjustments are in degrees. In Table 2, as in the first scenario of Table 1, there are overlapping adjustment periods and entity A is using the invention while entity B is not. In Table 2, however, there is misalignment in both the azimuth and elevation dimensions. Convergence to a desired degree of alignment in the azimuth and elevation dimensions is the same as explained above wherein entity A performs azimuth and elevation adjustments that are a fraction (in this case 0.5) of their respective error measurements.

In iteration 1, an azimuth error of 32 degrees is measured and an elevation error of 40 degrees is measured. Therefore, assuming a correction factor of 0.5 for both dimensions, entity A adjusts its beam in the azimuth direction 16 degrees and entity B adjusts its beam in the azimuth direction the full 32 degrees. Similarly, entities A and B also adjust their respective beams in the elevation dimension 20 degrees and 40 degrees, respectively. As shown in Table 2, this err continues for entities A and B in both the azimuth and elevation dimensions until a desired degree of alignment is achieved in both dimensions (i.e. iteration 6).

TABLE 2

Overlapping Adjustment Periods (Azimuth and Elevation)

| ITERATION | AZIMUTH ERROR MEASURED | ENTITY A AZIMUTH ADJUSTMENT | ENTITY B AZIMUTH ADJUSTMENT | ELEVATION ERROR MEASURED | ENTITY A ELEVATION ADJUSTMENT | ENTITY B ELEVATION ADJUSTMENT |
|---|---|---|---|---|---|---|
| 0 | 32 | 16 | 32 | 40 | 20 | 40 |
| 1 | 16 | 8 | 16 | 20 | 10 | 20 |
| 2 | 8 | 4 | 8 | 10 | 5 | 10 |
| 3 | 4 | 2 | 4 | 5 | 2.5 | 5 |
| 4 | 2 | 1 | 2 | 2.5 | 1.75 | 2.5 |
| 5 | 1 | 0.5 | 1 | 1.75 | .875 | 1.75 |
| 6 | 0.5 | 0 | 0 | .875 | 0 | 0 |

Although in Table 2 the same correction factor (i.e. 0.5) is used in both dimensions, it is important to note that different correction factors may be used in the azimuth and elevation dimensions. Furthermore, although convergence is shown for simplicity in Table 2 as being achieved in both dimensions at the same iteration (i.e. iteration 6), convergence in the azimuth and elevation dimensions may be achieved in different iterations.

Although the examples provided above are directed to specific scenarios for purposes of explaining the invention, there are of course an unlimited number of scenarios where error measurements are or are not being performed between two entities incapable of communicating control information regarding their respective use of beam forming. Regardless of the scenario, however, beams will converge (i.e. obtain a desired degree of alignment) as long as one entity is reducing its adjustment according to the present invention.

In the above description of the first embodiment, the entity implementing the present invention utilized a correction factor of 0.5. That is, in the above description, the entity using the invention reduced its adjustment to 0.5 of whatever error was measured. While a correction factor of 0.5 is preferred, the amount which the entity using the invention reduces the error measurement may be any number between 0 and 1.

Figure 9A:
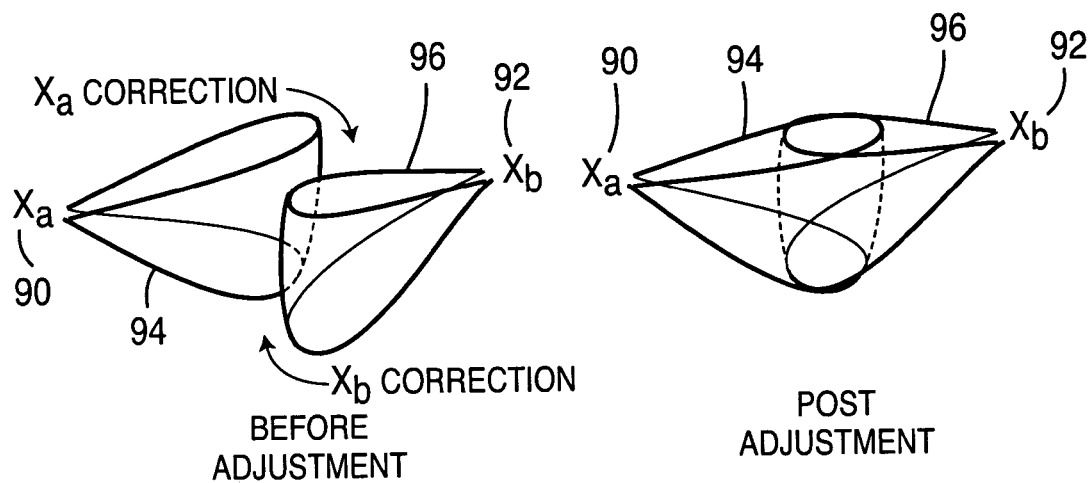
FIG. 9a is a base station and a WTRU correcting misalignment of their respective beams in an azimuth dimension according to a second embodiment of the invention.
Figure 9B:
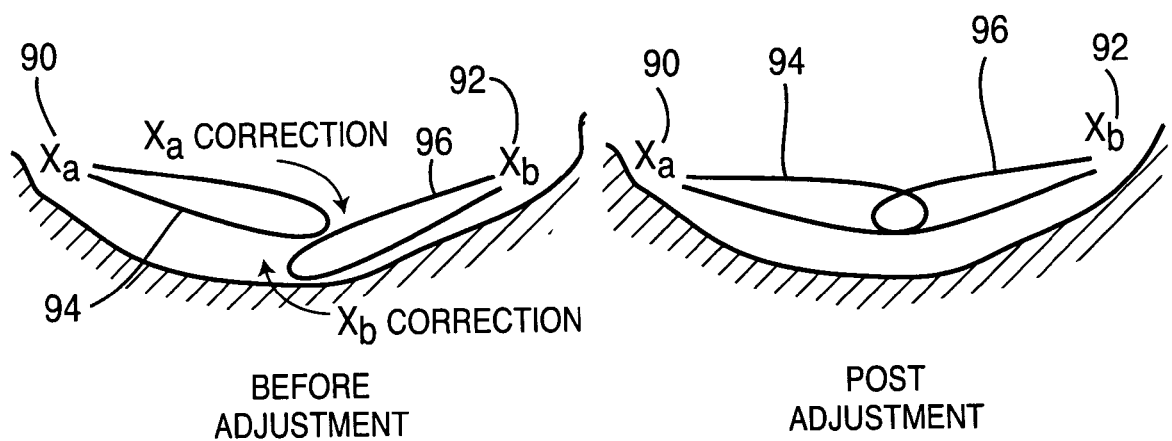
FIG. 9b is a base station and a WTRU correcting misalignment of their respective beams in an elevation dimension according to a second embodiment of the invention.

In a second embodiment, a wireless communication system and WTRU are capable of communicating and negotiating control of their respective use of beam forming. In this embodiment, two entities may simply agree on an appropriate correction factor. For example, in the second embodiment, entity A and B may agree, for whatever reason, that entity A will perform an adjustment that is equal to 0.2 of the error measured and entity B will perform an adjustment that is equal to 0.8 of the error measured. Therefore, as shown in Table 3 below, in iteration 0 where an error of 32 degrees is measured, entity A performs an adjustment of 6.4 degrees and entity B performs an adjustment of 25.6 degrees. Then, in iteration 1, an error of 0 is measured and no further action is required. This situation is illustrated in the azimuth dimension in FIG. 9*a* and in the elevation dimension in FIG. 9*b*. FIG. 9*a* is a plan view and FIG. 9*b* is an elevation view wherein a horizontal surface is shown in hash-marks.

TABLE 3

Overlapping Adjustment Periods

| ITERATION | ERROR MEASURED | ENTITY A ADJUSTMENT | ENTITY B ADJUSTMENT |
|---|---|---|---|
| 0 | 32 | 6.4 | 25.6 |
| 1 | 0 | 0 | 0 |

In this embodiment, because two entities can negotiate their respective use of beam forming, the particular correction factor that is used by each entity may take into account factors affecting their communication. For example, the correction may be adjusted according to the capabilities of the entity, the angle between two communicating entities, and the power with which the entities are transmitting their respective beams.

With respect to the capabilities of the entities, base stations typically have better phase array antennas then WTRUs thereby allowing them to make finer adjustments to their beams. Where this is in fact the case, it may be desirable to have the base station perform a larger portion of the adjustment by having the base station use a larger correction factor than the WTRU with which it is communicating.

With respect to the angle between two communicating entities, where there is a greater angle of adjustment needed for one entity than another, the entity with the greater angle of adjustment may use a greater correction factor. For example, for a WTRU being used in a car traveling past a base station with which it is communicating, the WTRU may need to adjust its antenna approximately 5 or 6 degrees for a correction whereas the base station, because it is using a wider beam, may only need to adjust its beam 1 or 2 degrees. Therefore, in this case, the majority of the adjustment may be allocated to the WTRU by having the WTRU use a greater correction factor than the base station.

With respect to the power with which the entities are transmitting their respective beams, a greater correction factor may be allocated to the entity transmitting with the highest power. That is, assuming a base station is transmitting at a higher power than a WTRU with which it is communicating, it may be desirable to have the majority of any necessary adjustment performed by the base station to avoid further attenuation of the WTRU's signal. In fact, unless another factor requires otherwise, it may be desirable to simply instruct the WTRU to refrain from moving its beam at all and have the base station perform an adjustment equal to 100% of the error measured. In this case, the correction factor for the WTRU is 0.0 and the correction factor for the base station is 1.0.

The errors measured and the adjustments made pursuant to the present invention may be made taking into account the orientation (azimuth and/or elevation) of the entities performing the error measurements and/or adjustments. For example, if an antenna is oriented 45 degrees downward in the elevation dimension to focus its beam toward the ground, any measurements and/or adjustments in the elevation dimension will account for the orientation of the antenna. Furthermore, it should be noted that while this invention utilizes the terms azimuth (i.e. horizontal) and elevation (i.e. vertical) to refer to specific orientations, the invention is equally applicable to rotations of the axis from these nominal orientations. For example, there are instances where antennas are intentionally setup such that they are specifically utilized at an angle offset relative to the nominal vertical or horizontal planes. Cross polarization implementations, for instance, are often set at a 45 degree angle. Likewise randomly deployed or mobile equipment may not have a known or fixed relationship to orientations normally associated with the terms used. Additionally, while degrees of freedom for the width adjustments and boresight may ideally be implemented 90 degrees relative to each other, it is also possible to implement the invention with any degrees of controllable freedom which are other than 0 degrees relative to each other.

The beam adjustments that are made pursuant to the present invention may be made using any appropriate parameter for adjusting beams. That is, correction of misaligned beams may be performed by adjusting any parameter capable of adjusting the beam(s) so that they properly overlap.

For example, beam adjustment is typically performed by adjusting the boresight of a beam (i.e. boresight orientation), the power with which a beam is being transmitted or the gain with which the signal is being received (collectively referred to as power gain), or the width of a beam (i.e. beam width). Of course, beams may be adjusted by adjusting all three of these parameters or a particular combination thereof. Further, two communicating entities may or may not use the same adjustment parameter for adjusting their respective beams.

The adjustment parameters may be performed in the azimuth dimension, elevation dimension, or a combination thereof. Performing an adjustment in one dimension may affect the beam in another dimension. For example, when adjusting a beam's width (and not adjusting power and boresight) to correct beams that are misaligned in the elevation dimension, an increase or decrease in the beam's width in the elevation dimension will cause an equal decrease or increase in the beam's width in the horizontal position. Further, the same or different adjustment parameters may be used in the elevation and azimuth dimensions.

The particular adjustment parameter or parameters that are used to adjust a beam or beams in order to correct misalignment may be chosen, as desired, according to operator preference. That is, one embodiment may be where boresight adjustment is the primary parameter for correcting misaligned beams wherein power and beam width are used in a secondary role where they are used to enhance or otherwise assist any adjustments made by adjusting a beam's boresight. For example, in this embodiment, where a correction of say 7 degrees needs to be performed in say an azimuth dimension, it may be desirable to use boresight to adjust the beams 5 degrees and increase/decrease (depending on whether the beam needs to be made larger or smaller) the power and/or increase/decrease the width for the remaining 2 degrees.

In another embodiment, all of the parameters may be primary options so that they are all equally available options for correcting beam misalignments. In this case, again using boresight, power, and beam width as the available parameters, when a correction needs to be made, the most efficient parameter(s) for performing the correction may be used. For example, in situations where there is not a fine resolution on boresight control (i.e. a particular antenna does not have a high resolution with respect to boresight control), any necessary adjustments, or the majority thereof, may be made by adjusting a beam's power or width or a combination of both.

Figure 10:
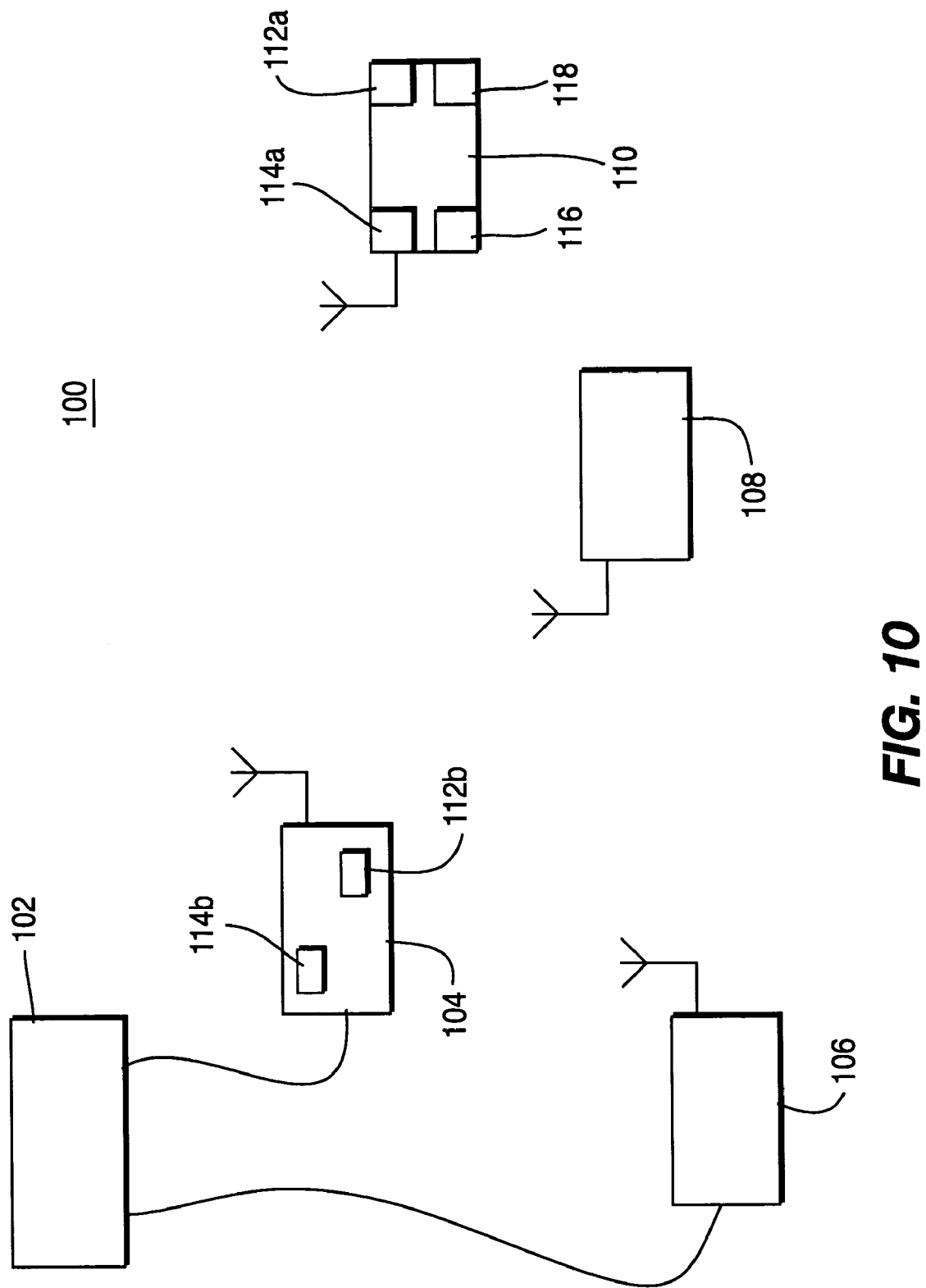
FIG. 10 is a wireless communication system wherein wireless entities operating within the system may adjust their beams to enhance communications within the system.

Referring now to FIG. 10, there is shown a wireless communication system 100 wherein beams may be adjusted to enhance wireless communications between wireless entities (e.g. base stations and WTRUs) operating within the system 100. The system 100 includes a plurality of wireless entities 104, 106, 108, 110 and at least one radio network controller (RNC) 102. Of course, the system components may vary according to the type of system in which the invention is being implemented. In system 100, wireless entities 104 and 106 are base stations while wireless entities 108 and 110 are WTRUs. The entities are capable of communicating using beam formed transmission and reception patterns and include a processor (see 112a for WTRU 110 and 112b for base station 104) for measuring an error in the alignment of their own beam and the beam of another entity with which they are communicating. When two entities (say 104 and 110) are communicating and an error in the alignment of their respective beams is detected, at least one of them will adjust their beam a fraction of the measured error as explained above. Processors 112a, 112b are preferably configured to select adjustment parameter(s) for performing whatever beam adjustments will be performed. The selection of adjustment parameters may include one or more parameters and is preferably based on the conditions surrounding the communication, as explained above. Additional processor(s) 114a, 114b may be provided for computing the fraction and adjusting the beam in an amount equal to the fraction multiplied by the measured error. A single processor or as many processors as desired may be used for performing the functions of the present invention. Where two communicating entities are not negotiating or otherwise coordinating their respective use of beam forming, the computed fraction is preferably 0.5, as explained above.

In a preferred embodiment, the wireless entities may negotiate their respective use of beam forming and therefore communicate so that, for example, the fractions used by each entity to adjust their respective beams sum to one. While the description of this embodiment is in connection with WTRU 110, it is equally applicable to any wireless entity (e.g. any WTRU and any base station in system 100). As mentioned, WTRU 110 includes a processor 112a configured to measure an error in the alignment of a beam emanating from the WTRU 110 and another wireless entity, say base station 104, with which WTRU 110 is communicating. WTRU 110 also includes a processor 114a configured to compute the fraction and adjust its beam in an amount equal to the computed fraction multiplied by the measured error.

In this embodiment, because two communicating entities negotiate their respective use of beam forming, it is preferable for at least one entity to actually compute a fraction based on the conditions of the communication (i.e. based on the distance and/or angle between the two entities or the capability of one entities' antenna versus another, for example) and for one entity to simply use a fraction equal to one minus the computed fraction. For example, assuming WTRU 110 is communicating with base station 104, WTRU 110 will compute a fraction based on the conditions of the communication and communicate that fraction to base station 104. Base station 104 will then simply compute a fraction by subtracting 1 minus the fraction provided by WTRU 110. This enables each entities' 110, 104 respective beam to converge as explained in connection with FIGS. 9a and 9b.

To perform the negotiation of beam forming between wireless entities, the entities preferably include a transmitter and receiver for communicating control information regarding the use of beam forming. That is, continuing with WTRU 110 as an example, WTRU 110 preferably includes a transmitter 116 configured to transmit any type of control information including the fraction with which WTRU 110 will adjust its beam to the entity with which WTRU 110 is communicating.

The WTRU 110 also preferably includes a receiver 118 configured to receive any type of control information from another wireless entity with which WTRU 110 is communicating. The control information may include the fraction being used by the entity with which WTRU 110 is communicating. Of course whether WTRU 110 is receiving or transmitting a fraction may depend on whether WTRU 110 is the entity computing the fraction based on the conditions surrounding the communication, as opposed to using one minus whatever fraction the other entity is using.

As mentioned above, the present invention is described in the context of infrastructure and mobile (i.e. WTRU and base station) communications. However, the use of beam forming between WTRUs and between entities with an infrastructure is a natural extension of the present invention and is certainly within the scope thereof. For example, if one of two communicating WTRUs can be established to be statically positioned, then the present invention may be implemented as outlined above. If two WTRUs are in relative motion with respect to each other, then beam forming usage and correction of misaligned beams is also the same as above, but subject to the relative motion of the WTRUs. Further, in this embodiment, as with the embodiments described above, the errors that are measured and the adjustments that are made may be performed in the azimuth dimension, the elevation dimension, or both.

As also noted above, the present invention may be implemented between any two entities negotiating the use of beam forming. For example, the present invention may be used in backhaul applications to increase system capacity and facilitate quick deployment of base stations. Two more-specific examples include implementing the present invention with WTRUs functioning in a mesh network mode and base stations deployed without direct connections to the backhaul network (i.e. wireless base stations that not only wirelessly connect to WTRUs, but also wirelessly connect to other parts of a wireless network).

Figure 11:
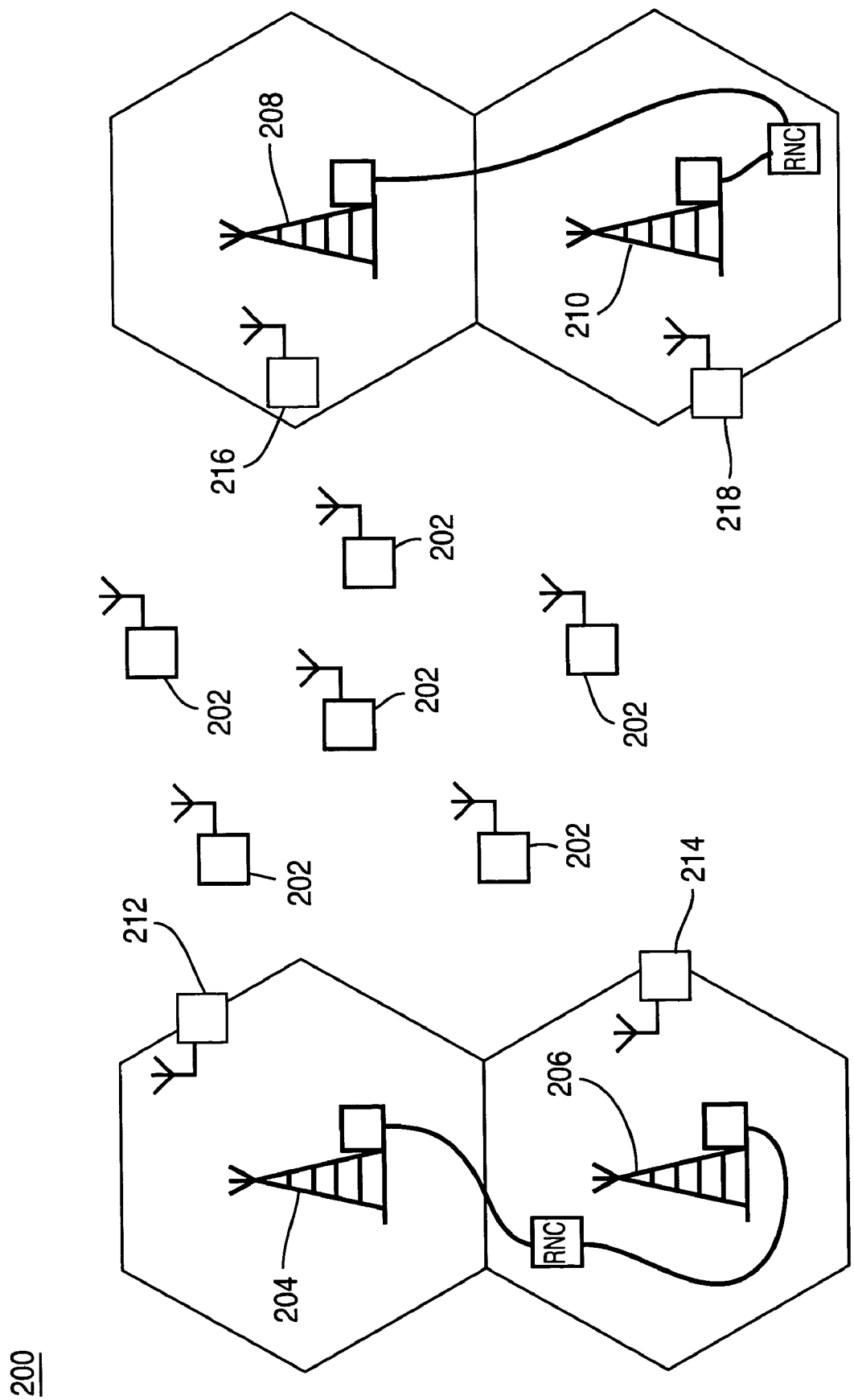
FIG. 11 is a wireless communication system wherein WTRUs are operating in a mesh network mode and acting as base stations from the perspective of the system and may negotiate the use of beam forming in accordance with the present invention.

Referring now to FIG. 11, for example, there is shown a wireless communication system 200 wherein WTRUs 202 are operating in a mesh network mode so as to provide coverage in an area where coverage, purely by way of example, is not provided by base stations 204-210. The WTRUs may be operating with a full wireless mesh topology or a partial wireless mesh topology, as desired. The WTRUs 202 while functioning as WTRUs from the perspective of their respective users, are also functioning as base stations from the perspective of the system 200. To support the mesh network functionality, negotiation of beam forming, as explained in detail above, may be utilized between WTRUs 202 themselves or between a WTRU within group 202 and another WTRU 212-218 interfacing with one of the base stations 204-210. As also mentioned above, where two WTRUs are in relative motion with respect to each other, beam forming usage and correction of misaligned beams is subject to the relative motion of the WTRUs.

It is noted that while WTRUs 202 are shown in an area where coverage is not provided by base stations 204-210, a group of WTRUs similar to group 202 may be provided in an area where coverage is available. For example, a group may be provided in an existing coverage area of a first system type (e.g. cellular type system) to provide enhanced service within the area for the first system type or to provide access to a second system type (e.g. WLAN type system). In either case, negotiation of beam forming between two entities may be utilized, as desired.

Figure 12:
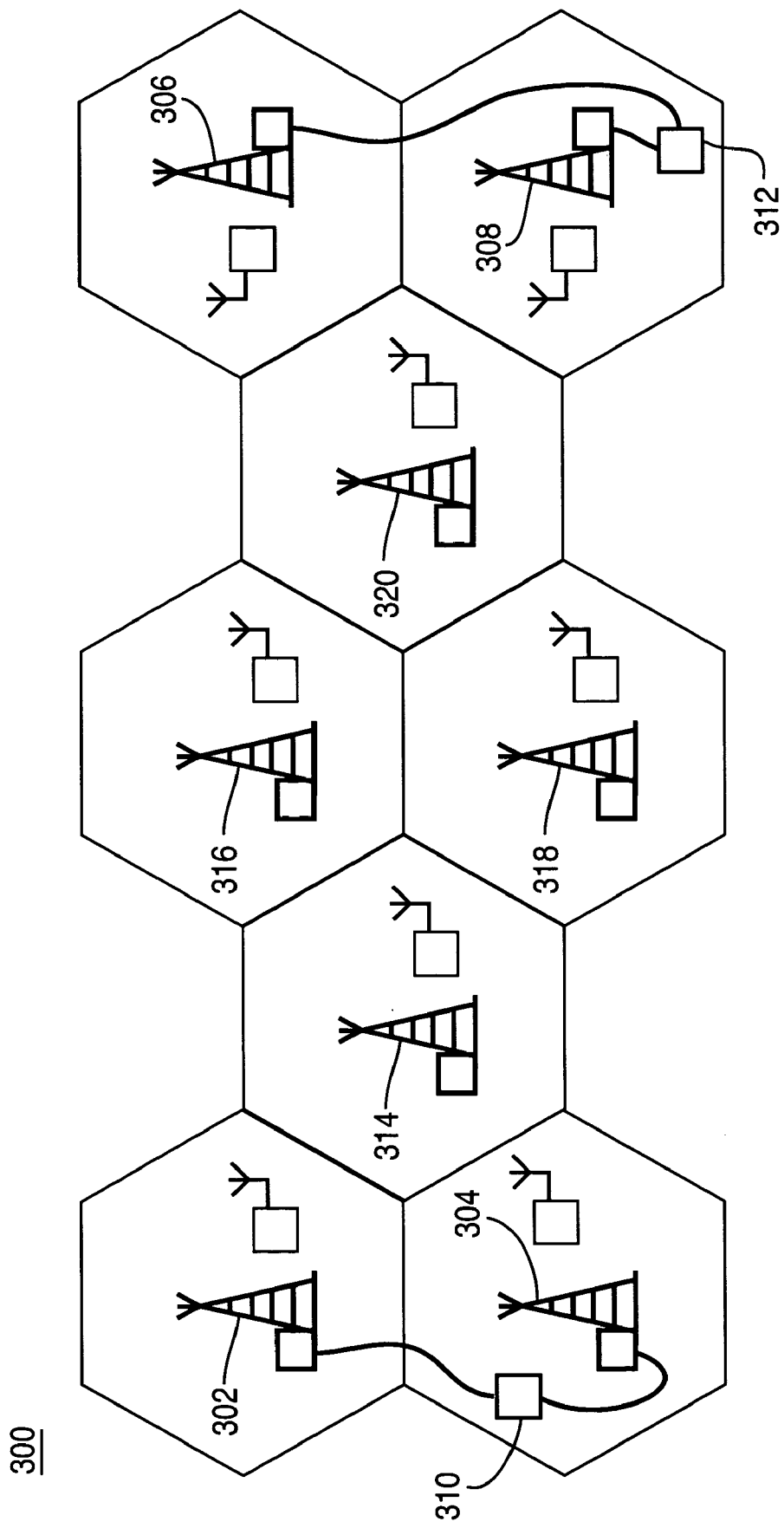
FIG. 12 is a coverage area of a wireless communication system wherein the coverage area includes base stations that are deployed without direct wired connections to a radio network controller and may negotiate the use of beam forming not only with WTRUs but also other base stations having direct wired connections to the radio network controller in accordance with the present invention.

Referring now to FIG. 12, another example of implementing the present invention in a backhaul type environment is shown. In FIG. 12, a coverage area 300 is shown wherein the coverage area includes base stations 302-308 that are deployed with direct wired connections to an RNC 310, 312. To provide additional coverage area, however, while avoiding expensive direct wired connections to RNCs, additional base stations 314-320 are provided. These base stations 314-320 are deployed without direct wired connections to either an RNC or another base station that is directly connected to an RNC. Wireless base stations 314-320 typically use their spare capacity or alternate RF link capabilities to connect to other network components such as, for example, base stations 302-308 that have a direct (or indirect) wired connection to an RNC 310, 312. In this embodiment, negotiation of beam forming between entities is not only used between base stations and WTRUs, but may also be used between wireless base stations 314-320 themselves and/or between wireless base stations 314-320 and wired base stations 302-308 to enhance communications, as explained in detail above.

Implementing the present invention in backhaul links as described in connection with FIGS. 11 and 12 allows such links to be established with minimal user intervention to either initial setup and link maintenance. For example, link maintenance as a result of, for example, changes in the existence of entities, movement of entities, and/or viability of usage due to capacity, quality of service, or user reconfiguration may be enhanced by negotiating beam forming in accordance with the present invention. That is, the present invention enables components of a backhaul network (i.e. base stations, etc.) to be implemented with automatic configuration and reconfiguration while maximizing system capacity via beam forming.

Although the features and elements of the present invention are described in the preferred embodiments in particular combinations, each feature or element can be used alone (without the other features and elements of the preferred embodiments) or in various combinations with or without other features and elements of the present invention.

It is important to note that the present invention may be implemented in any type of wireless communication system, as desired. By way of example, the present invention may be implemented in UMTS-FDD, UMTS-TDD, TDSCDMA, CDMA2000 (EV-DO and EV-DV), any type of wireless local area network (WLAN), or any other type of wireless communication system. Further, while the present invention has been described in terms of various embodiments, other variations, which are within the scope of the invention as outlined in the claim below will be apparent to those skilled in the art.

What is claimed is:

1. A method for coordinating the use of beam forming by a first communicating entity wherein control information regarding the use of beam forming is not communicated, the method comprising:

selected for reduction of the amount in which the first entity will adjust its beam in response to misalignment between beams emanating from the first entity and a second entity;

measuring an error in the alignment of the beams emanating from the first and second communicating entities;

selecting at least one adjustment parameter for adjusting the beam of the selected first entity; and adjusting the beam of the first entity using the selected adjustment parameter.

2. The method of claim 1 wherein the first entity a WTRU wherein the WTRU is functioning at least in part as a base station.

3. The method of claim 1 wherein the first communicating entity is a wireless base station.

4. The method of claim 1 wherein the at least one adjustment parameter is selected from the group consisting of boresight orientation, beam width, and power gain.

5. The method of claim 1 further comprising:
repeating the measuring and adjusting until the error measured is below a predetermined value.

6. A wireless base station configured to maintain alignment of its beam with the beam of another wireless entity, the base station comprising:
a first processor configured to measure an error in the alignment of a first beam emanating from the base station and a second beam emanating from the other wireless entity;
wherein the first processor is further configured to select at least one adjustment parameter for adjusting the first beam; and
a second processor configured to compute a first fraction and adjust the first beam using the at least one selected parameter in an amount equal to the first fraction multiplied by the error measured.

7. The wireless base station of claim 6 further comprising:
a transmitter configured to transmit the fraction of the measured error that the base station will adjust its beam to the wireless entity with which the wireless base station is communicating.

8. The wireless base station of claim 7 further comprising:
a receiver configured to receive, from the wireless entity with which the base station is communicating, a second fraction with which the entity used to adjusts its beam; and
wherein when a second fraction is received, the second processor being configured to compute the first fraction by subtracting one minus the second fraction and adjusting the first beam in an amount equal to the first fraction multiplied by the error measured.

9. The wireless base station of claim 8 wherein the wireless entity with which the base station is communicating is another wireless base station.

10. The wireless base station of claim 8 wherein the wireless entity with which the base station is communicating is a WTRU.

11. The wireless base station of claim 8 wherein the wireless entity with which the base station is communicating is a base station having a wired connection to a radio network controller (RNC).

12. The wireless base station of claim 6 wherein the at least one adjustment parameter is selected from the group consisting of boresight orientation, beam width, and power gain.

* * * * *

UNITED STATES PATENT AND TRADEMARK OFFICE
CERTIFICATE OF CORRECTION

PATENT NO. : 7,447,523 B2
APPLICATION NO. : 10/845829
DATED : November 4, 2008
INVENTOR(S) : Goldberg et al.

Page 1 of 1

It is certified that error appears in the above-identified patent and that said Letters Patent is hereby corrected as shown below:

At column 6, line 64, after the word "this" delete "ern" and insert therefor --pattern--.

At claim 1, column 12, line 60, before the words "first entity" delete "selected".

Signed and Sealed this

Third Day of March, 2009

JOHN DOLL
*Acting Director of the United States Patent and Trademark Office*